United States Patent [19]

Czichy et al.

[11] Patent Number: 4,618,259

[45] Date of Patent: Oct. 21, 1986

[54] STAR AND SUN SENSOR FOR ATTITUDE AND POSITION CONTROL

[75] Inventors: Reinhard Czichy, Ottobrunn; Wilhelm Goeschel, Taufkirchen, both of Fed. Rep. of Germany

[73] Assignee: MBB GmbH, Munich, Fed. Rep. of Germany

[21] Appl. No.: 718,358

[22] Filed: Apr. 1, 1985

[30] Foreign Application Priority Data

Mar. 31, 1984 [DE] Fed. Rep. of Germany ....... 3412046

[51] Int. Cl.⁴ .................. G01B 11/26; G01C 1/00; F41G 1/38
[52] U.S. Cl. ............................ 356/152; 33/249
[58] Field of Search ............... 356/141, 152, 247, 248, 356/249, 250; 33/268, 269, 271; 250/203 R

[56] References Cited

U.S. PATENT DOCUMENTS 3,744,913 7/1973 Farthing et al. .............. 356/141
3,931,515 1/1976 Parkin .......................... 356/152
4,225,781 9/1980 Hammons .................... 356/152
4,367,403 1/1983 Miller ........................... 356/141

*Primary Examiner*—Stephen C. Buczinski
*Assistant Examiner*—Melissa Koltak
*Attorney, Agent, or Firm*—Ralf H. Siegemund

[57] ABSTRACT

A combined sun and star sensing system for attitude and position control of a space vehicle, includes a star image sensor having a first objective and a first detector array arranged in the focal plane, the objective being constructed for a well defined aberration so as to convert a point like object into a defined spot or area having a diameter larger than the diameter of an element of the detector array; the sun sensor has a regular objective and a second detector array is arranged in the image plane of that objective sun sensor; the two detector arrays have similar and a similar number of detector elements, and are alternately connected to a single evaluating electronic.

4 Claims, 2 Drawing Figures

STAR AND SUN SENSOR FOR ATTITUDE AND POSITION CONTROL

BACKGROUND OF THE INVENTION

The present invention relates to sensing stellar objects such as the position of the sun and of stars for purposes attitude control of a space vehicle.

In order to determine attitude and orientation of a satellite in outer space optical detectors have been suggested which acquire so to speak the position of the sun and/or of particular bright stars. Corresponding to the position data thus acquired the satellite or space vehicle will be controlled with regard to its orientation and attitude. It has to be observed however, that f.ex. in the case of imaging the sun a disk, so to speak, is reproduced having a considerable larger diameter than a point like image of even the brightest star. These differences in image size of disk and point are to be understood in relation to the diameter or other representative dimension of a detector element. In view of these differences one needs in fact different and actually different types of electronic processing and evaluation circuits for determining the position of the sun and for determinging the position of any star. This problem is for example described in "Development Studies for a Polaris Sensor", SIRA Institute LTd. of June 1979, and in "Technical Description Sun Sensor" MBB/Erno of Nov. 28, 1983.

DESCRIPTION OF THE INVENTION

It is an object of the present invention to provide a new and improved star and sun sensor or sensing system for purposes of providing an input in attitude and orientation control system of a space vehicle in which the electronics is considerably simpler as compared with a known system.

In accordance with the preferred embodiment of the present invention it is suggested to provide a star sensor having an objective lens or lens system for producing an image in a plane which contains a first detector array; the particular objective lens is constructed to provide within the image plane a well defined aberration so that point like light sources such as stars are in fact reproduced as light areas or spots having a diameter which is in effect larger than the diameter of one of the detector elements of the detector array; in addition a sun sensor is provided having an objective lens or lens system for imaging the sun onto another detector array having the same number and being similarly arranged as the detector elements of the first detector array, whereby however no such controlled or defined aberration is produced; the two detector arrays will be alternately connected through an appropriate switching circuit to a single evaluation circuit.

The introduction of a well defined aberation within the objective lens system for the star sensor thus causes the production of images of the stars which are comparable in size with the image of the sun. This feature then makes it possible to detect the sun by means of an detector system which is constructed similar to the detector system for the detection of stars. This in turn permits the evaluation of the outputs of the two detectors, or detectors arrays in similar fashion, i.e. the evaluation of the detector system signals and their processing does not have to distinguish, from a circuit configuration point of view, between the image of the sun and the images of the stars. This feature then permits the utilization of a single evaluation circuit and electronics which is accordingly alternatingly connected to the two detector arrays because permanent connection of either is not necessary.

The enlargement so to speak of point like light sources to larger spots by means of the star sensor generally offers the additional advantage that an accurate determination of the angle of a star can be carried out. Actually the accuracy is better than seemingly given by the diameter of a detector element. This aspect will be explained more fully below in conjunction with the description of the preferred embodiment.

DESCRIPTION OF THE DRAWINGS

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings in which:

Proceeding now to the detailed description of the drawings FIG. 1 illustrates a space vehicle 1 carrying on its surface receivers or detectors 2 and 3 respectively pertaining to a sun and to a star sensor. The respective optical axes of the receivers or detectors 2 and 3 are oriented such that for a particular attitude of the space vehicle in outer space the axis of device 2 will in fact point to the center of the sun, while the device 3 has been positioned so that for that particular orientation of device 2 vis-a-vis the sun, the device 3 is oriented towards a particular star or star group or cluster of stars. The receivers 2 and 3 are respectively connected to a common evaluation circuit 8 via cable 6 and 7 respectively.

This being the general layout, FIG. 2 illustrates more fully the construction of a combined star and sun sensor system. The two receiver units 2 and 3 are respectively provided with entrance objective lenses or lens systems 2.1 and 3.1. respectively each having a focal and imaging plane, there being detector arrays 2.2. and 3.2. respectively arranged in these image planes. A suitable detector array is constructed either as a charge coupled device (CCD) or as a charge injection device (CID). It is important however, that these two devices 2.2 and 3.2. are constructed similarly. By way of example each detector element within the arrays may have a diameter of typically 28 micrometers, covering an image area in each instance in an arrangement wherein 256 by 256 detector elements are arranged in such an array. Typically the star detector may have a 5° by 5° angle range which corresponds to 70 arc seconds for each detector element in the star receiver 3. Since the aberration of optic 3.1 enlarges each star point into a spot larger than 70 arc seconds, more than one detector element will receive light from that spot. Through interpolation an accuracy of about 2 arc seconds can be obtained.

Figure 1:
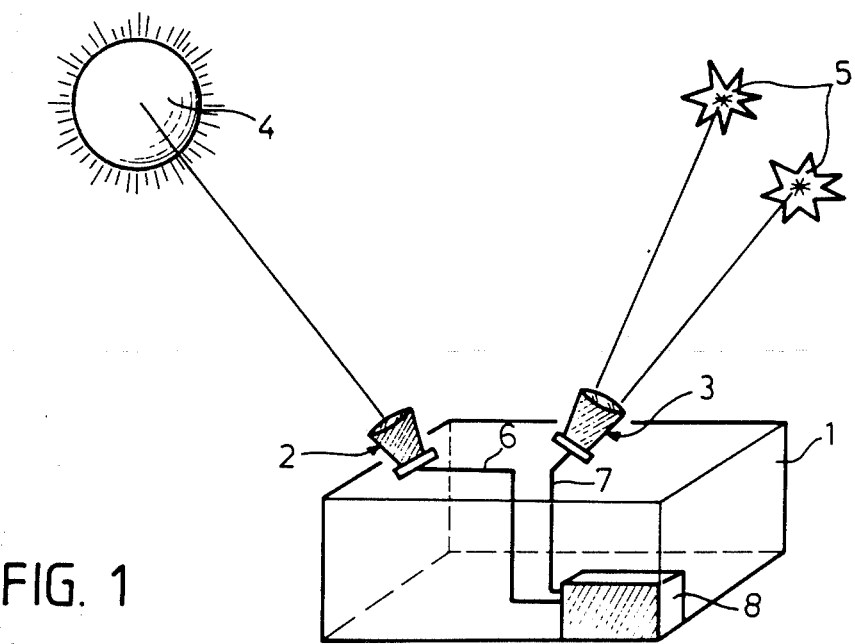
FIG. 1 is a somewhat schematic view of a space vehicle which includes a combined star and sun sensor system.
Figure 2:
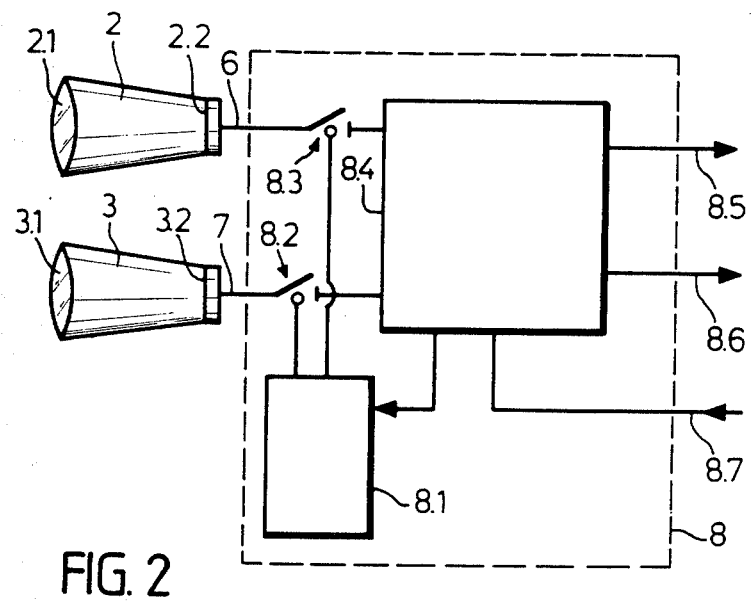
FIG. 2 illustrates the basic configuration of the combined star and sun sensor shown in FIG. 1.

The objective lens 3.1 of the star sensor 3 is preferably of the Petzval type or of the Gaussian type and has therefore a well defined aberration. Hence the image of a star imaged onto the detector array 3.2 will be a spot with a diameter it is approx. equal to the diameter of two detector elements. It is adviseable to select the optic 2.1 of the solar or sun sensor 2 to cover a larger range or field of views of about 60° by 60°. The detector arrays however are similar for both sensors. This means that the electronics of immediate image sensing of stars or the sun is the same so that the same type of outputs are produced. Differences in the sensing process are accomodated optically namely by chosing the appropriate spatial-angular field of view and by optically distoring images so as to put areal (sun) and point like (stars) light sources on a geometrically equal footing!

In view of the geometric enlargement as far as imaging of near point like sources is concerned, and in further view of the relative contraction of the image of sun on accout of the differently wide fields of view, the images of the sun and of the stars on the respective detector arrays are comparable geometrically and can, therefore, be evaluated electronically in a similar or comparable fashion, particular for determining the location of the respective dot center. This is carried out by means of the evaluating electronics 8 which is alternately coupled to the two detectors arrays 2.2 and 3.2.

The evaluating electronic 8 is comprised of a selector and scanning circuit 81 which alternately closes and opens to switches 8.2 and 8.3 respectively included in the connection 6 and 7. Moreover, circuit 81 may control a detector element by detector element interrogation of the respective array. The evaluating circuit 8 includes furthermore a processing electronic 8.4 and data output lines or buses 8.5 and 8.6. In addition electronic 84 is provided a command signal input or input line 8.7.

The process electronic 8.4 basically supervises and controls the data flow between the satellite proper and its control element as far as position and attitude is concerned, on one hand, and the receivers 2 and 3 on the other hand. Moreover the electronics 8.4. receives commands from the satellite and controls more or less autonomously the connection of the two arrays 2.2 and 3.2 to the evaluating electronic 8.4 so that the data of one or the other is being evaluated. Of course this operation has to be synchronized internally.

During operation the satellite, i.e. the central control system of the satellite can enforce certain operational modes as far as the processor 8.4 is concerned and these modes can be established through appropriate command signals reaching the processor 8.4 via the input line 8.7. For example if star and sun sensing is to be actuated simultaneously as one particular mode, the processor 8.4 will control the circuit 8.1 in such a manner that the control 8.1 alternatingly opens and closes the switches 8.2 and 8.3. The data of interest are of course outputs provided by the arrays 2.2 and 3.2 and in each instance the arrays are caused to furnish its output signals for example in a stream of data. The circuit 8.1 will include the array scanning control for that purpose so that for example during a first cycle, which switch 8.2 is closed array 3.2 will provide a stream of outputs, from the several detector elements and which are fed to the processor 8.4 and stored therein for further evaluation. During this evaluation process the circuit 8.1 may provide for a changeover in that a switch 8.2 is opened and switch 8.3 is closed, where upon array 2.2. is interrogated and will provide its output as a dot stream to a second buffer, memory portion or the line in the processor 8.4. This way then the circuit 8.4 will receive alternatnigly a stream of data, each stream being one complete set of detector element outputs.

The processor electronics will process the respective data by means of particular interpolation and equalizing algorithms for ascertaining the center of the imaged light sources being either the sun or the stars as optically processed by the aberration optic 2.1. The processing of the signals in that regard is known through the processing of signals representing the image of the sun disk, and now the images of the star or stars and their respective location is carried out analogously. The processing is carried out by the same electronics 18.4 which is the principle feature of the invention, but of course is carried out on a time sharing basis, i.e. alternatingly for sun and stellar images. Accordingly, the outputs representing the ascertained center of the images in each instance are separately provided to output lines 8.5 and 8.6 to be appropriately used by the satellite attitude and position control system. These data are of course provided in digital form, but of course digital to analog conversion may be interposed if desired.

As can readily be seen the star sensing and the sun sensing operates in a quasi parallel mode if for example the switch over from one detector array to the respective other one and back is a periodic operation. This mode of operation is however not essential in principal, it may well be desirable to provide controlled processing of one or the other type of sensor; in a different mode of operation the satellite will command the unit 8 to operate for example in a solar data acquisition mode, during which mode the switch 8.3 will be and remain closed until a mode change occurs, which may be a steller acquisition mode, in which the switch 8.2 remains closed for its duration.

The invention is not limited to the embodiments described above, but all changes and modifications thereof, not constituting departures from the spirit and scope of the invention are intended to be included.

We claim:

1. A combined sun and star sensing system for attitude and position control of a space vehicle, comprising:
    a star image sensor, including a first objective lens or lens system having a focal and image plane, there being a first detector array arranged in said image plane;
    said objective or objective lens system being constructed for a well defined aberration so as to convert a point like object into a defined spot or area having a diameter larger than the diameter of an element of said first detector array;
    a sun sensor including a second objective lens or lens system having an image and focal plane, there being a second detector array being arranged in the image plane of said second objective of the sun sensor;
    said first and second detector arrays having similar and a similar number of detector elements;
    a single evaluating electronic for detector array images; and
    switching means for selectively connecting said first and said detector array to said evaluating electronic.

2. A combination as in claim 1, wherein said first objective lens or lens system or the star sensor provides for a correction of the chromatic aberration through a spectral range from 0.3 to 1.2 micrometers.

3. A combination as in claim 1, wherein said first objective lens or lens system provides a spherical aberration or apodisation.

4. A combination as in claim 1, wherein said evaluating electronics is constructed to determine the center of any image spot, independently from a source for the spot.

* * * * *